R. DEERING, Sr.
Hemp Brake.
No. 4,075.
Patented June 10, 1845.
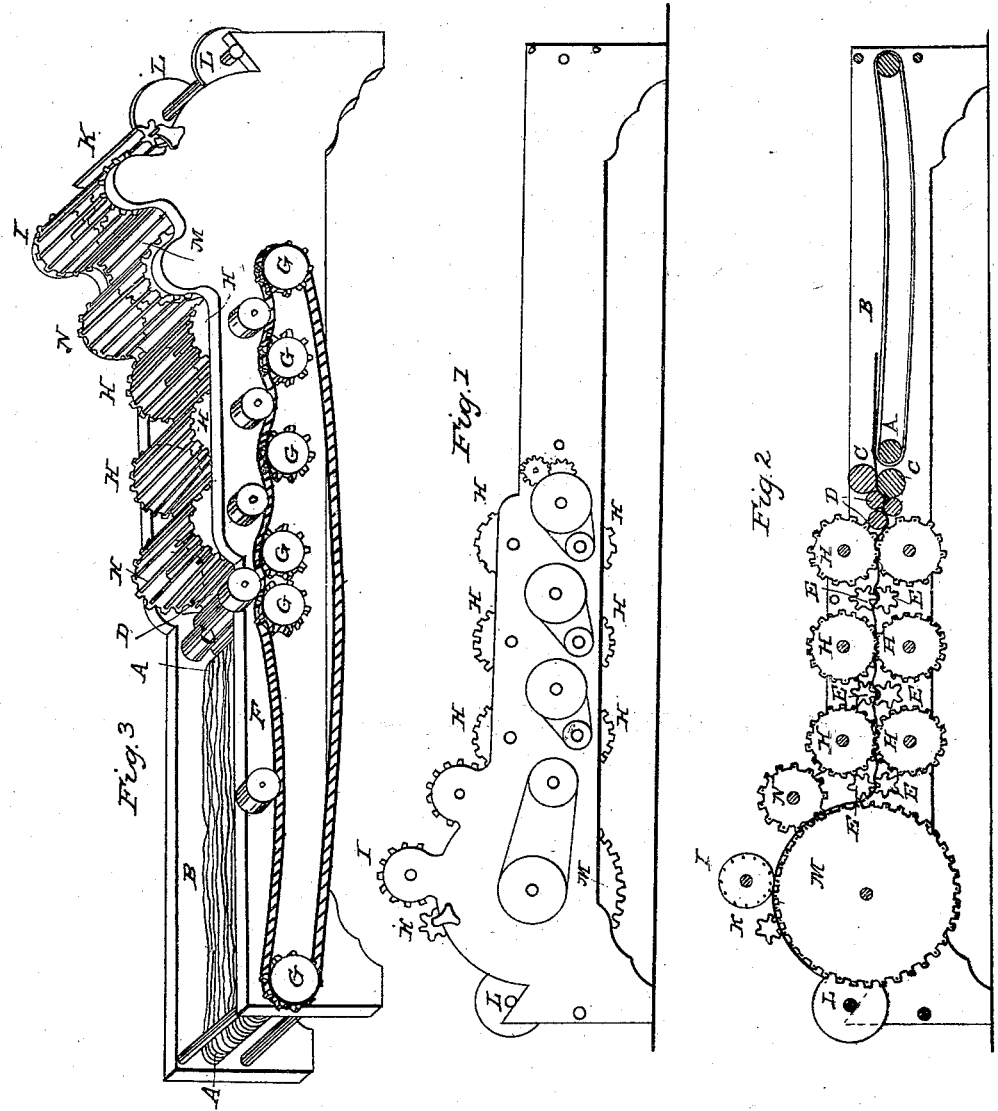

UNITED STATES PATENT OFFICE.

RICHARD DEERING, SR., OF LOUISVILLE, KENTUCKY.

IMPROVEMENT IN MACHINES FOR LOOSENING AND SEPARATING THE BOON FROM THE FIBER OF HEMP, &c.

Specification forming part of Letters Patent No. 4,075, dated June 10, 1845.

*To all whom it may concern:*

Be it known that I, RICHARD DEERING, Sr., of the city of Louisville, and State of Kentucky, have invented a new and useful machine for detaching the harl of hemp, &c., from the boon, and cleaning, milling, and preparing hemp or any similar fibrous substance for manufacturing the various articles and fabrics for which they are adapted or can be used; and I do hereby declare that the following is a full, clear, and exact description of the construction and operation of the same, reference being had to the annexed drawings, making a part of this specification, in which—

Figure 1 is a side elevation, Fig. 2 a longitudinal section, and Fig. 3 a perspective view, of the machine.

A A are feeding-rollers.

B is the apron upon which the hemp, &c., are spread, and by which it is carried to the first smooth rollers.

C C are smooth rollers (about seven inches diameter) for receiving the hemp from the feeding-apron.

D D D are small smooth rollers (about four inches diameter) the surfaces of which revolve with the same speed as the smooth rollers C C, and in the same direction. This series of smooth rollers C C D D D are all heavily levered on their journals, and they are so arranged that each roller in the lower series occupies the space between two of the rollers in the upper series. As the surfaces of all these rollers move with the same speed and in the same direction, the hemp in passing between the upper and lower series of rollers will not be rubbed or drawn as is the case in other machines, but will be bent, curved, and pressed in a waving line alternately upward and downward, which bending and curving, in connection with the uniform pressure of the rollers, completely loosens the harl from the boon of the hemp, &c., without breaking and injuring the fiber. The number of these rollers must be increased as the quality of the staple may make necessary, and their diameter may be regularly decreased from the first rollers toward the last, as circumstances may require.

E E E E E are pairs of small holding-rollers fluted lengthwise. One roller in each pair is placed immediately above the other, and the flutes of the upper and lower rollers fit closely into each other. The speed with which the surfaces of all these fluted rollers revolve should be such as to take up the hemp as fast as it is delivered from the series of smooth rollers without producing any strain or tension on the fiber.

In each of the places occupied by the pairs of fluted rollers E E E E E, and in their stead, I design sometimes to introduce three small smooth rollers working together in the same manner as D D D.

All the above-described rollers are made to revolve by means of an endless chain, (marked F,) operating on a series of cog-wheels, (marked G,) and by other suitable gearing on the opposite side of the machine.

H H H H H are open cylinders or beaters, the surfaces of which are made of polished rods of round iron. They are put together in the same manner as the common trundle-head, and geared into each other by cogs at each end, and made to revolve with an accelerated speed, as much greater than the rollers C, D, and E as may be best adapted to suit the quality of the material to be acted on, the velocity of each succeeding pair of beaters to be increased in such ratio as may be best suited for removing the shives, refining the fiber, and increasing the softness of the hemp or other fibrous substance as it passes between them. The boxes in which the journals of the beaters revolve are to be made adjustable, so as to increase or diminish the engagedness or depth of gearing of the bars or rods forming the surfaces of the cylinders. The bars or rods of each beater should work between but not touch those of the beater connected with it.

The rapidly-revolving cylinders, instead of being of equal sizes, and arranged as H H, may be varied in size and arrangement by increasing the diameter of the lower cylinder, as M, and placing on its surface one or more smaller open cylinders, as N, which is also geared into M by cogs on their ends. The bars or rods of the cylinder I are made of stiff leather or other pliable material. This cylinder has a reversed motion, and is placed above the cylinder M, the bars or rods of these cylinders not being in contact with each other. The bars of the cylinder I serve only to brush back and straighten the fiber which has been displaced by the action of the rapidly-revolving cylinders.

K is the holding-roller on the cylinder M.

L is the reel for bailing the hemp.

The machine herein described operates in the following manner, viz: The hemp passes from the feeding-apron B, and is drawn between the series of smooth rollers C C D D D, arranged as described, for the purpose of loosening the harl from the boon of the hemp. From this series of smooth rollers the hemp passes between the first pair of rapidly-revolving open cylinders H H to clean or whip out the boon from the harl. The hemp then passes between the first pair of holding-rollers E E, or between a series of small smooth rollers substituted in their stead and working together in the same manner as the rollers D D D. These holding-rollers take up the fiber as fast as it is delivered from D D D, keeping the fiber straight, but not so stretched as to strain or injure it. They are succeeded by a second pair of rapidly-revolving open cylinders, and these again by another pair or series of slowly-revolving holding-rollers. This alternate arrangement of rapidly-revolving open cylinders and slowly-revolving holding-rollers is to be repeated as often as may be necessary to free the hemp from the shoves, and to sufficiently mill, soften, and refine the fiber.

After passing through the machine, as above described, the hemp is completely bailed by being wound on the reel instead of twisting it in handfuls and baling it in the usual manner.

The reel L is put in motion by the power that drives the other parts of the machinery.

Having thus fully described the nature and operation of my improvements in the mode of breaking and dressing hemp, &c., what I claim as my invention, and desire to secure by Letters Patent, is—

The combination and arrangement of the series of smooth pressing and bending rollers revolving in the same direction and with the same speed, for the purpose of loosening and separating the boon from the fibers, the same operating substantially as herein set forth, and these, thus combined and operating, I claim in combination with the holding-rollers and beating-cylinders, or either of them, substantially in the manner and for the purposes herein set forth.

RICHD. DEERING, SR.

Witnesses:
CLEMT. T. COOK,
WM. W. STEWART.